(12) United States Patent
Grantham

(10) Patent No.: US 7,010,960 B1
(45) Date of Patent: Mar. 14, 2006

(54) SCAN DEVICE AND METHOD FOR TESTING FILTERS FOR LEAKS

(76) Inventor: James I. Grantham, P.O. Box 31442, Raleigh, NC (US) 37622

( * ) Notice: Subject to any disclaimer, the term of this patent is extended or adjusted under 35 U.S.C. 154(b) by 0 days.

(21) Appl. No.: 10/961,046

(22) Filed: Oct. 12, 2004

Related U.S. Application Data

(60) Provisional application No. 60/509,913, filed on Oct. 10, 2003.

(51) Int. Cl.
*G01M 3/02* (2006.01)

(52) U.S. Cl. .................. 73/40; 73/863.31; 73/863.33
(58) Field of Classification Search .................. 73/40, 73/863.31, 863.33
See application file for complete search history.

(56) References Cited

U.S. PATENT DOCUMENTS 4,494,403 A * 1/1985 Bowers et al. ............... 73/40.7

FOREIGN PATENT DOCUMENTS

| JP | 59-10831 A | * | 1/1984 | .................. 73/104 |
| JP | 1-164414 A | * | 6/1989 | .............. 73/863.23 |
| JP | 4-77646 A | * | 3/1992 | .................... 73/40 |
| JP | 2001-108606 A | * | 4/2001 | .................... 73/40 |
| JP | 2002-243626 A | * | 8/2002 | .................... 73/40 |

* cited by examiner

*Primary Examiner*—Daniel S. Larkin
(74) *Attorney, Agent, or Firm*—William H. Holt

(57) ABSTRACT

A scanner and method of operation for inspecting high efficiency filters to detect the presence of pin-hole leaks. The scanner includes a plurality of funnel members movable along guide members and connected by tube members to a monitoring device for detecting any contaminants contained in gases entrained in the funnel members.

6 Claims, 1 Drawing Sheet

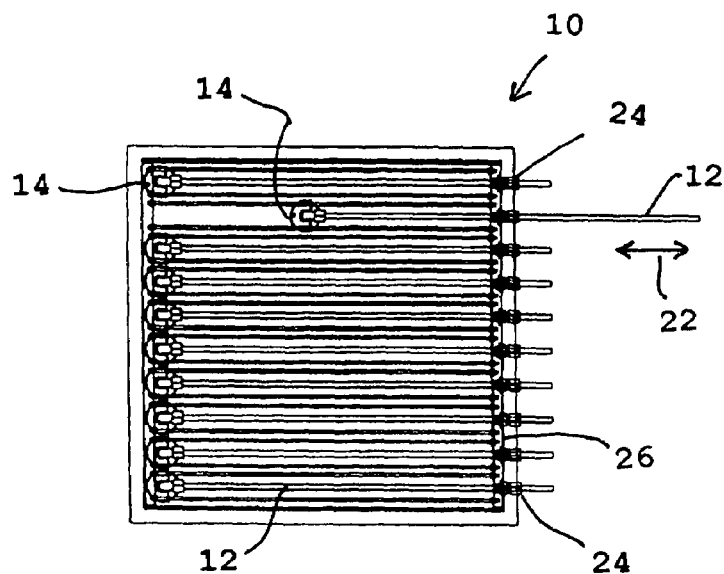
FIG. 1
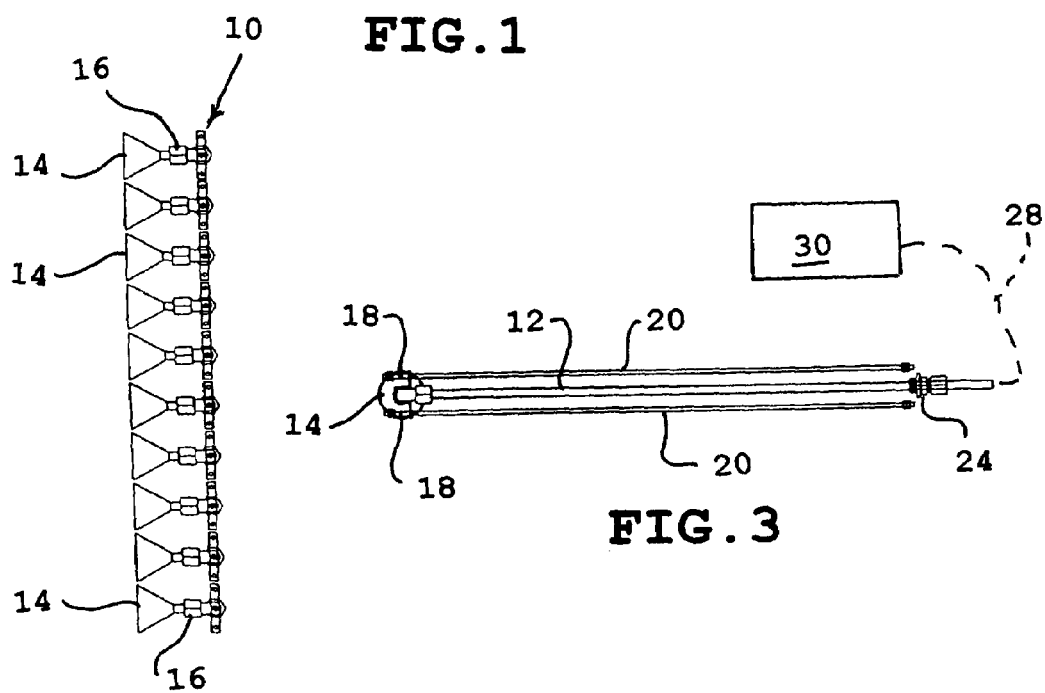
FIG. 2
FIG. 3

SCAN DEVICE AND METHOD FOR TESTING FILTERS FOR LEAKS

This application claims the benefit of provisional application 60/509,913 filed Oct. 10, 2003.

The invention relates to a new and improved apparatus and method for testing high efficiency filters for the presence of leaks.

BACKGROUND OF THE INVENTION

High efficiency filters are used for capturing, removing and/or eliminating hazardous bacteria, viruses and other undesirable matter from fluids, and more particularly from the flow of gases such as air, oxygen and the like in environments in which the purity of the gases is critically sensitive and must not contain contaminants or other forms of pollutants.

SUMMARY OF THE INVENTION

The present invention is particularly useful with ultra high efficiency, containment filter modules designed specifically for hazardous applications, such as is disclosed and discussed in my U.S. Pat. No. 6,149,699 dated Nov. 21, 2000.

A novel apparatus and novel method including the use of a plurality of probes are used for scanning across the entire filter surface area for assuring detection of any pin-hole leaks.

BRIEF DESCRIPTION OF THE DRAWINGS

FIG. 1 is a frontal view of a novel scanner in accordance with the present invention.

FIG. 2 is a fragmentary, side view, taken from the left side of FIG. 1 and shows an array of funnel members aligned along one side wall of the scanner.

FIG. 3 is an enlarged, fragmentary view of a single scanner tube member, a pair of related spaced guide bars, and fitment members for connecting the scanner tube to a vacuum source and monitoring device.

DESCRIPTION OF THE PREFERRED EMBODIMENT

FIG. 1 shows a scanner, generally indicated by the numeral 10, which is particularly adapted to be used for examining high efficiency, HEPA filters, as shown in my U.S. Pat. No. 6,149,699, the construction and details of which are incorporated herein by reference. The scanner 10 is to be located closely adjacent to and assembled immediately downstream from the filter which is to be examined to assure that there are no pin hole leaks which would allow contaminants to pass through the filter.

The scanner 10 is comprised of a plurality of movable probes, ten being shown, comprised of a series of hollow tube members 12, preferably made of aluminum to allow for incineration subsequent to use, each tube member 12 having a funnel member 14 affixed at one end thereof by an individual, 90 degree, elbow member 16. Each funnel member 14 is provided with grommet means 18 for allowing slidable movement thereof along a pair of parallel spaced guide bars 20, as best shown in FIG. 3, extending across the face of scanner 10, as is best shown in FIG. 1. The area of the scanner 10 corresponds to the area of the filter to be examined such that the total filter face area can be scanned by moving each of the tube members 12 inwardly and outwardly, as is indicated by the double headed arrow 22 shown in FIG. 1. Fittings 24 support the tubes in a housing wall 26 and are used to guide the tube members 12 as the funnel members 14 are drawn across the face of scanner 10. Fittings 24 are designed for providing an airtight seal about the tube members 12 when the scanning is complete. The outside end of tube members 12 are preferably closed with aluminum caps when not in use. During examination of a filter, it is to be understood that gases passing through the filter are drawn into the tube member 12 as it and its related funnel member 14 are moved across the face of the scanner and filter. Any contaminants passing through a pinhole leak in the filter will be drawn through funnel member 14 and tube member 12 and passed through a flexible tube member 28 connected to a monitoring device 30 wherein the gas will be analyzed to detect the existence of any contaminants which would indicate the presence of a leak in the filter large enough to pass the contaminant. It is to be understood that monitoring device 30 includes a source of vacuum for drawing gases through funnel members 14 and tube members 12.

Thus, as is apparent from the foregoing description and accompanying drawings, the present invention provides a means and method for testing filters for minute leaks and permits meeting the NSF-49 specifications applicable to high efficiency filters utilized in hazardous applications.

I claim:

1. A scanner for inspecting a filter for detecting and locating pin-hole leaks, said scanner including; an array of funnel members, a plurality of parallel guide means disposed across said scanner for mounting said funnel members for individual movement across said scanner, each of said funnel members being connected to an individual one of a plurality of hollow tube members extending across said filter, and means for connecting each of said tube members to a monitoring device.

2. A scanner as defined in claim 1 wherein said array of funnel members are alignable in a line along one dimension of said scanner and said funnel members are separately movable along said parallel guide means for providing complete coverage of the area of said scanner.

3. A scanner as defined in claim 1 wherein said means for connecting said tube members to a monitoring device include a fitment at an end of each hollow tube member and a flexible hose member for extending to said monitoring device.

4. A method for inspecting a filter to detect pin-hole leaks, said method including the steps of: providing an array of funnel members, sequentially moving said funnel members along a series of parallel guide means disposed across said filter, and passing gases entering said funnel members to a monitoring device for detecting any contaminants that become entrained in said funnel members.

5. A scanner for inspecting a filter for detecting pin-hole leaks, said scanner including an array of funnel members, guide means disposed across said scanner for mounting said funnel members for individual movement across said scanner, each of said funnel members being connected to one of a plurality of hollow tube members, and means for connecting said tube members to a monitoring device, wherein said array of funnel members are alignable in a line along one dimension of said scanner and are separately movable along said guide means for providing complete coverage of the area of said scanner.

6. A scanner as defined in claim 5 wherein said means for connecting said tube members to a monitoring device include a fitment at an end of each hollow tube member and a flexible hose member for extending to said monitoring device.

* * * * *